United States Patent [19]

Shaturov et al.

[11] 4,456,407
[45] Jun. 26, 1984

[54] ROTARY CUTTING TOOL

[75] Inventors: Gennady F. Shaturov; Sergei S. Malyavko, both of Mogilev, U.S.S.R.

[73] Assignee: Mogilevskoe Otdelenie Fizikotekhnicheskogo Instituta Akademii Nauk Beloruskoi SSR, Mogilev, U.S.S.R.

[21] Appl. No.: 457,634

[22] Filed: Jan. 13, 1983

[51] Int. Cl.³ .............................................. B26D 1/12
[52] U.S. Cl. ............................................ 407/7; 82/1 C
[58] Field of Search .................. 82/1 R, 1 C, DIG. 9; 407/7, 120, 42, 30, 33

[56] References Cited

U.S. PATENT DOCUMENTS 3,486,542 12/1969 Blackwell ........................... 144/133
4,178,818 12/1979 Yascheritsyn et al. ............. 82/36 R
4,191,075 3/1980 Morgunsky et al. ................ 82/36 R

FOREIGN PATENT DOCUMENTS 0450648 12/1974 U.S.S.R. .................................. 407/7
0611724 6/1978 U.S.S.R. .................................. 407/7
0707696 1/1980 U.S.S.R. .................................. 407/7
0764856 9/1980 U.S.S.R. .................................. 82/1 R

Primary Examiner—Leonidas Vlachos
Assistant Examiner—William E. Terrell
Attorney, Agent, or Firm—Burgess, Ryan & Wayne

[57] ABSTRACT

A rotary cutting tool incorporates a bushing for fitting a shaft carrying a cutter at its cantilevered end; a central portion of the bushing is of uniform stiffness both longitudinally and circumferentially and end portions of the bushing are of a nonuniform stiffness changing from a maximum to a minimum longitudinally towards the end faces of the bushing.

11 Claims, 9 Drawing Figures

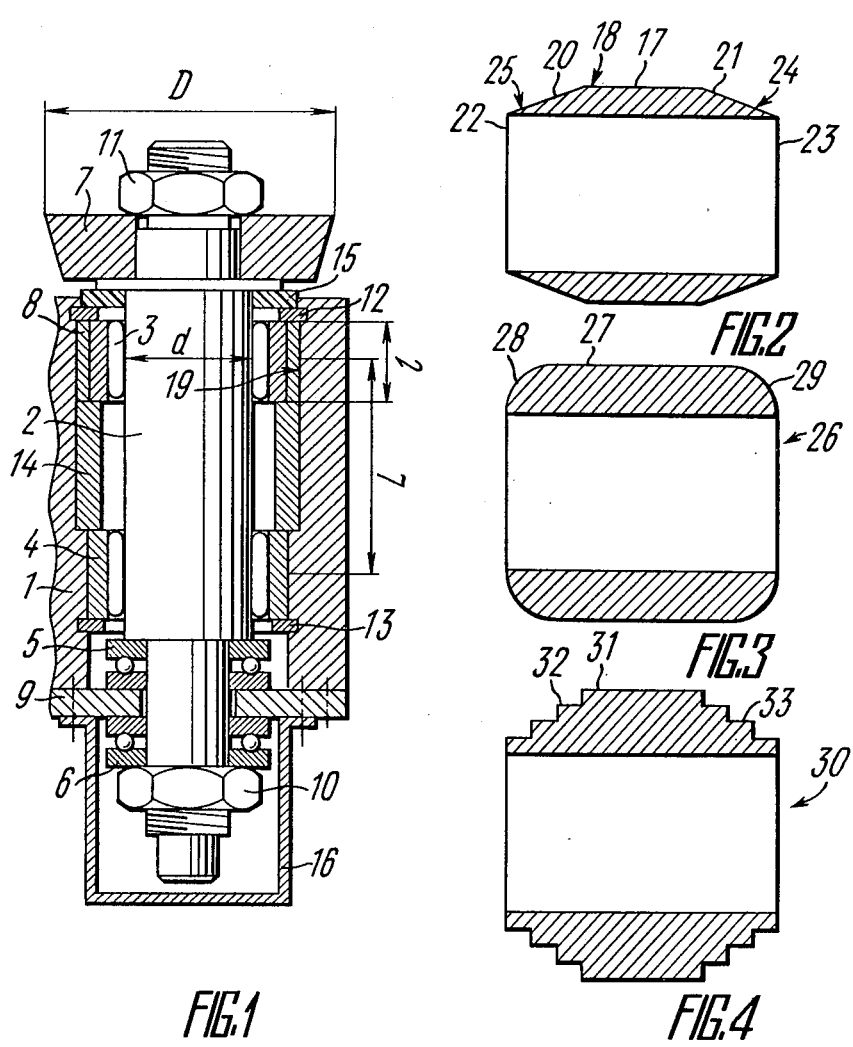

ROTARY CUTTING TOOL

FIELD OF THE INVENTION

The present invention relates to machining and has specific reference to rotary cutting tools. Holding out special promise in finishing applicator rolls used by the wood-pulp and paper industry, it may also find application in the finish-machining of metals (alloys included) and nonmetals.

BACKGROUND OF THE INVENTION

Rotary cutting tools have come nowadays into widespread use as finishing tools. Rotary machining characterized by the rotary motions of the tool and workpiece about their respective axes minimizes the rate of slip in the zone of contact between the tool and the workpiece, extending this zone at the same time, and reduces the generation of heat by 30–60%. The result is good tool stability, short machine time and improved surface finish. Inherent in all rotary cutting tools are common design features such as a cutter attached to a cantilevered end of a shaft supported by a ball bearing assembly which is accommodated in a body. The spindle assembly used in the known rotary tools lacks durability and the cutter displays poor stability.

There is known a rotary cutting tool having a body with journal and thrust bearings giving support to a shaft carrying a cutter at its cantilevered end. In operation, the cutting force bends the shaft out-of-true with the axis of the journal bearing next the cutter. The line of the contact between the shaft and bearing becomes an ellipse rather than a circle and, as a result, the durability of the shaft and that of the tool as a whole is impaired. Moreover, an excessive runout of the cutter at its edges resulting from the wear on the journal bearing reduces the stability of the cutter.

SUMMARY OF THE INVENTION

It is an object of the present invention to eliminate said disadvantages and to provide a novel rotary cutting tool of an advanced construction.

Another object of the present invention is to provide a rotary cutting tool displaying good stability.

A further object of the present invention is to provide a rotary cutting tool the service life whereof is longer than that of the known rotary cutting tools used for the same purposes.

In accordance with said and other objects the essence of the invention is that in a rotary cutting tool having a body with journal and thrust bearings giving support to a shaft carrying a cutter at its cantilevered end, the journal bearing next the cutter is fitted according to the invention by means of a bushing of uniform stiffness both longitudinally and circumferentially within its central portion, a surface whereof mating an internal surface in the body is of an identical shape therewith, and of nonuniform stiffness within its end portions which changes from a maximum to a minimum longitudinally towards the end faces of the bushing as well as circumferentially, the maximum and minimum values of the stiffness of the end portions of the bushing being located in the same plane.

By virtue of the bushing incorporated into the body of the tool, the resultant cutting force acts in the symmetry plane of the bushing, or one close thereto, which is drawn through the regions of the minimum and maximum stiffness. The end portions of the bushing with minimum stiffness bend along with the cantilever tool shaft when this is bend by the cutting force in operation.

The journal bearing, fitted into the tool body by means of the bushing, self-aligns parallel to the tool axis because of being located in the zones of elastic deformations of the end portions of the bushing. This improves the performance of the journal bearing and reduces its wear, providing for better durability and stability of the cutter.

It is expedient that the end portions of the bushing are shaped as bodies of revolution the generatrices whereof differ from the generatrix of the central portion of the bushing which is of a cylindrical shape.

In this case, the stiffness of the bushing in its end portions is longitudinally a nonuniform one, and the stiffness of the external surface of the central part shaped cylindrically is uniform both longitudinally and circumferentially; this provides for fitting the bushing into the body of the tool.

It is also expedient that, in those cases when the tool is intended to cope with machining jobs giving rise to shock loads of short duration, the external surfaces of the end portions of the bushing are of a spherical shape. Then, the stiffness of the end portions of the bushing will change longitudinally in accordance with a parabola and their elastic deformation will vary with the radius of the sphere, the greater the radius the larger the allowable elastic deformation and vice versa.

It is further expedient that in order to cope with finishing jobs the external surfaces of the end portions of the bushing are given a tapered shape. In consequence, the stiffness of the end portions of the bushing will change longitudinally in a linear way. An increase in the taper of the end portions adds to the stiffness of the bushing because of a decrease in the length of the end portion.

For the machining of workpieces having surface irregularities the removal of which sets up shock loads and calls for a higher than average cutting force, it is preferred to give the external surfaces of the end portions of the bushing a stepped cylindrical shape. The longitudinal stiffness of the end portions of the bushing is obtained in this case by varying the extent of the cylindrical steps both diametrically and longitudinally. This provides for uniform stiffness at any step of each end portion while the overall stiffness of this portion remains a nonuniform one.

It is also preferred that the end portions of the bushing are provided with longitudinal slots spaced nonequidistantly apart all the way along the circumference. This plan is conducive to obtaining a requisite nonuniform stiffness. Widening or narrowing the nonuniform spacing of the slots, it is possible to increase or decrease the amount of metal confined between the slots, controlling in this way stiffness.

It is further preferred that the end portions of the bushing are eccentric with respect to the axis of the central portion thereof, the eccentricities of the end portions being located at either side of the axis of the central portion. In this case, the end portions of the bushing are of different thickness and, as a consequence, the thinner the end portion the less is the stiffness of the bushing. Since the eccentricities are located at either side of the axis of the central portion, the stiffness is at its minimum also at either side of said axis and, consequently, the peaks of the stiffness of the end portions will be directed oppositely to the throws.

It is advantageous to provide the end portions of the bushing with collars two surfaces whereof facing one another make with the axis of the bushing the same angles and two other surfaces being parallel to one another. The circumferential stiffness of such a bushing is nonuniform because of the thickness of each collar, as measured along the axis of the bushing, being nonuniform too. The thinner the collar the lower is the stiffness. Apart from that, the collars limit the magnitude of the elastic displacements of the end portions of the bushing in operation.

It is also advantageous that the journal bearing next the cutter is of a length, as measured along the axis of the cutting tool, determined by the relation $$l/D = 0.15 - 0.5$$

where l is the length of the journal bearing next the cutter, mm; D is the diameter of the cutter, mm. In this case, the vector of the resultant cutting force will pass through, or close to, the journal bearing in question so that the shock loads coming thereon will be at a minimum, ensuring durability thereof.

It is advisable to ascribe the lower values of the above relation to finishing jobs when the line of action of the vector of the resulting cutting force fluctuates through a small angle. The higher values of said relation obtainable, for example, when the cutting tool is fitted with a double-row bearing are practical to use for machining jobs characterized by a significant angle of the fluctuation of the line of action of said vector.

It is further advantageous that the ratio of the internal diameter of the journal bearing next the cutter to the diameter of the cutter is determined by the relation $$d/D = 0.2 - 0.6$$

where d is the internal diameter of the journal bearing next the cutter, mm; D is the diameter of the cutter, mm.

The stiffness of the journal bearing in question, varying directly with the internal diameter thereof, depends on the diameter of the cutter, for an increase in this diameter brings about a significant increase in the cutting force. For a given diameter of the cutter, an optimum stiffness of the journal bearing is obtained by observing the above ratio. Its lower values are ascribed to finishing operations and higher ones, to jobs entailing shock loads.

Finally, it appears advisable that the spacing of the journal bearings is less than 2D but greater than the distance determined by the expression $$L \geq 10 \sqrt[3]{(0.1d)^4}$$

where L is the spacing of the journal bearings from one another, mm; d is the internal diameter of the journal beaing next the cutter, mm.

The spacing of the journal bearings is decided directly by the internal diameter of that bearing which is next the cutter. The larger is this diameter, the closer must be the spacing of the bearings, for the greater the diameter of the cutter the higher the cutting force, other things being equal. However, it is impractical to set the journal bearings wider apart than 2D, for this will add to the size of, and the metal requirements for, the tool without an appreciable gain in its durability. The applicability of the above expressions in determining the value of l has been proved experimentally.

BRIEF DESCRIPTION OF THE DRAWINGS

The present invention will now be described by way of an example with reference to the accompanying drawings in which FIG. 1 is a sectional elevation of the rotary cutting tool according to the invention;

FIG. 2 is a sectional elevation of the bushing according to the invention of a uniform stiffness in the central portion and of a nonuniform stiffness in the end portions;

FIG. 3 is sectional elevation of the bushing according to the invention in another modification wherein the external surfaces of the end portions are of a spherical shape;

FIG. 4 is a sectional elevation of the bushing according to the invention in a further modification wherein the external surfaces of the end portions are of a stepped cylindrical shape;

DETAILED DESCRIPTION OF THE INVENTION

Figure 5:
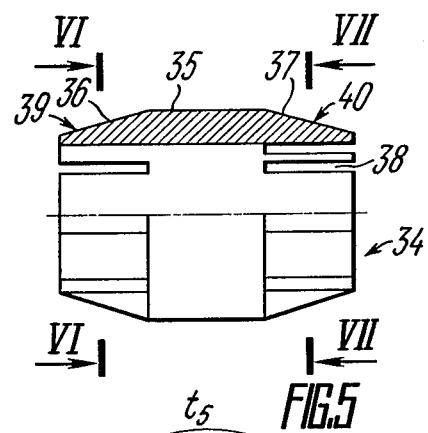
FIG. 5 is an elevation, partly cut away, of the bushing according to the invention in still another modification wherein the end portions are provided with longitudinal slots spaced nonequidistantly apart all the way along the circumference.

Referring to FIG. 1, the disclosed rotary cutting tool incorporates a body 1 accommodated wherein by means of journal bearings 3, 4 and thrust bearings 5, 6 is a shaft 2 carrying a cutter 7 at its cantilevered end. The journal bearing 3 next the cutter 7 is fitted into the body 1 with the aid of a bushing 8. The cutter 7 is secured to the shaft 2 by a nut 11. The axial loads on the shaft 2 are sustained by the thrust bearing 5 (e.g. a ball bearing) given support by a cover plate 9 attached to the body 1 by screws (not shown). Any axial displacement of the shaft 2 is taken care of by the thrust bearing 6 and nut 10. Check rings 12, 13 and a distance sleeve 14 prevent axial displacement of the journal bearings 3, 4. A seal 15 and a housing 16 keep dirt out of the bearing assembly comprising the journal bearings 3, 4 and the thrust bearings 5, 6.

In accordance with the invention, a central portion 17 (FIG. 2) of the bushing 8 has a stiffness which is uniform both longitudinally and circumferentially, and a surface 18 of said central portion 17 mates an internal surface 19 (FIG. 1) in the body 1 of the cutting tool and is identical with said surface. The end portions 20, 21 of the bushing 8 have a nonuniform stiffness changing from a maximum to a minimum longitudinally towards end faces 22, 23 of the bushing 8 as well as circumferentially, the values of the maximum and minimum stiffness of the end portions 20, 21 being located in the same plane. The uniform longitudinal and circumferential stiffness of the central portion 17 is obtained due to the cylindrical shape of said portion. The nonuniform stiffness of the end portions 20, 21 of the bushing 8 is achieved because of shaping said portions as bodies of revolution the generatrices 24, 25 whereof differ from the generatrix of the surface 18 of the central portion 17.

For a nonuniform stiffness of the bushing longitudinally towards the end faces 22, 23, the end portions 20, 21 are taper-shaped. For a circumferential nonuniform stiffness of the bushing 8, the cross-sectional areas of the end portions 20, 21 in any two planes drawn at right angles to the axis of the bushing 8 differ from one another. Said bushing is recommended for use in a tool intended for finish-machining when the journal bearing 3 next the cutter 7 is a ball bearing.

Referring to FIG. 3, the bushing 26 has a central portion 27 and end portions 28, 29 given a spherical shape ensuring the durability of the tool in machining workpieces bringing about radial loads of short duration. It is expedient to use said bushing 26 in tools employing a ball bearing as the journal bearing 3 next the cutter 7.

Referring to FIG. 4, the bushing 30 has a central portion 31 and end portions 32, 33 of a stepped cylindrical shape. Said bushing 30 can be used to advantage in tools designed to machine workpieces giving rise to a higher than average cutting forces. The journal bearing next the cutter must be provided in the form of a ball bearing, a single- or double-row one.

Figure 6:
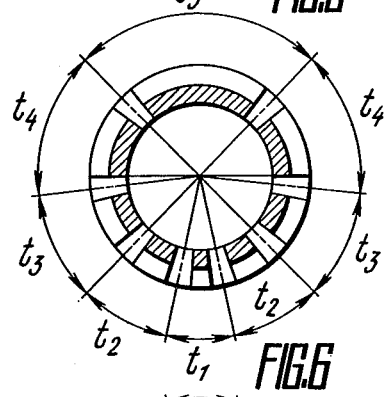
FIG. 6 is a section on line VI—VI of FIG. 5.
Figure 7:
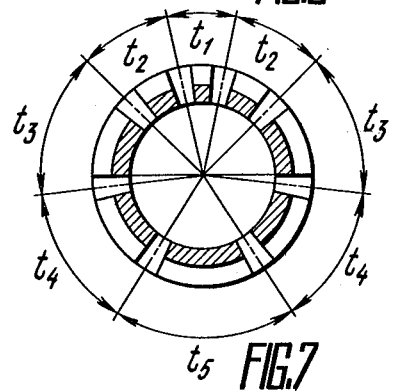
FIG. 7 is a section on line VII—VII of FIG. 5.

The bushing 34 depicted in FIG. 5 has a central portion 35 and end portions 36, 37 which are provided with longitudinal slots 38. The external surfaces 39, 40 of the end portions 36, 37 are taper-shaped, ensuring a nonuniform stiffness longitudinally. For a nonuniform circumferential stiffness, the slots 38 are spaced nonequidistantly apart at $t_1$ (FIGS. 6, 7), $t_2$, $t_3$, $t_4$, $t_5$ all the way along the circumference. The maximum nonuniform stiffness of the bushing 34 within the end portion 36, as defined by the maximum spacing $t_5$ (FIG. 6), is decided by the minimum spacing $t_1$ (FIG. 7) within the end portion 37 or, in other words, by the minimum stiffness.

The field of application of said bushing 34 are tools intended for finishing wherein the journal bearing next the cutter is a needle roller bearing.

Figure 8:
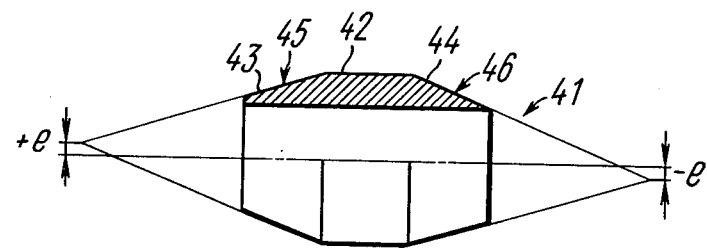
FIG. 8 is an elevation, partly cut away, of the bushing according to the invention in a modification having the end portions located eccentrically with respect to the axis of the central portion.

The bushing 41 illustrated in FIG. 8 comprises a central portion 42 and end portions 43, 44 the external surfaces 45, 46 whereof are located eccentrically with respect to the axis of the central portion 42. Both end portions 43, 44 have the same throws $+e$ and $-e$ arranged symmetrically on either side of the axis of the central portion 42. Said bushing 41 is recommended for use in tools intended to machine workpieces having some surface irregularities. The journal bearing next the cutter must be a needle roller bearing in this case.

Figure 9:
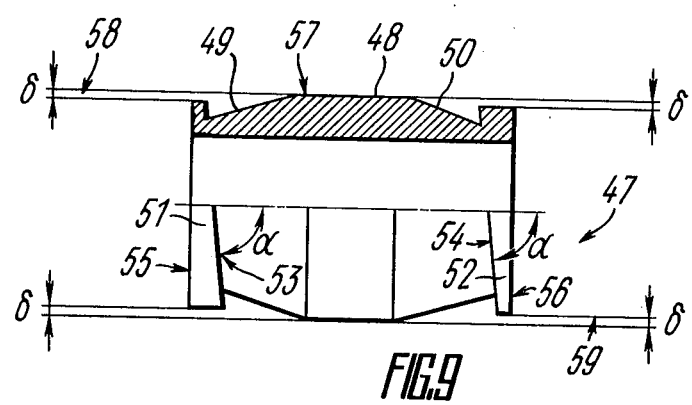
FIG. 9 is an elevation, partly cut away, of the bushing according to the invention in another modification having collars in the end portions.

The bushing 47 shown in FIG. 9 comprises a central portion 48 and end portions 49, 50 with collars 51, 52, respectively. Two surfaces 53, 54 of said collars 51, 52 which face one another make the same angles $\alpha$ with the axis of the bushing 47. Two other surfaces 55, 56 of the collars, 51, 52 are parallel to one another. The diameters of the collars 51, 52 are somewhat smaller than the external diameter of the central portion 48 so that a clearance $\delta$ is guaranteed between the surface 57 of the central portion 48 and the surfaces 58, 59 of the collars 51, 52 to limit the amount of the elastic deformation of the end portions 49, 50 in operation.

Said bushing 47 may be used in tools intended to cope with machining jobs associated with impact loads and high cutting forces, provided the journal bearing fitted into the bushing is a needle roller one.

The dimensions of the main components comprising the rotary cutting tool and the way they interact must be taken into consideration, as shown in FIG. 1, while designing the tool.

It is preferred that the ratio of the length 1 of the journal bearing 3 next the cutter 7 and the external diameter D of the cutter 7 is within the limits $$l/D = 0.15 - 0.5$$

If the above ratio is less than indicated, the journal bearing 3 will lack stiffness and the tool will have a short life.

It is further preferred that the ratio of the internal diameter d of the journal bearing 3 next the cutter 7 and the diameter D of the cutter 7 satisfies the relation $$d/D = 0.2 - 0.6$$

A ratio lower than the specified value leads to a failure of the journal bearing 3 to give the anticipated durability due to impaired stiffness. A too high ratio will result in an increase in the size of, and the metal requirements for, the tool without improving the durability thereof.

It is practical that the spacing L of the journal bearings 3, 4 is less than 2D but greater than the distance given by the relation $$L \geq 10 \sqrt[3]{(0.1d)^4}$$

where d is the internal diameter of the journal bearing 3 next the cutter 7.

A spacing L less than the recommended one will cause a rapid wear on the journal bearing 3 next the cutter 7, and a spacing L greater than the specified one results in an increase in the length of the tool and of its cost without improving performance and durability.

OPERATING PRINCIPLE

The rotary cutting tool provided in accordance with the invention operates as follows.

When the cutter 7 rotating integrally with the shaft 2, which is supported by the bearing assembly, is fed longitudinally against the rotating workpiece, the cutting force causes the shaft 2 to bend. At the same time, the outer race of the journal bearing 3 next the cutter 7 which fits into the bushing 8 is set thereby parallel to the axis of bending of the tool within the confines of the elastic deformations of the end portions 20, 21 displaying minimum stiffness and bending with the shaft 2. This self-alignment of the outer race is possible due to the nonuniform stiffness of the bushing 8 changing longitudinally and circumferentially and the clearance $\delta$ existing between the end portions 20, 21 and the mounting surface 18 in the body 1 of the tool. The rollers of the journal bearing 3 are involved into the contact with the inner raceway of the outer race within their entire length. This creates favourable conditions for the operation of the bearing assembly, minimizing the shock loads on the journal bearing 3 next the cutter 7. As a result, said journal bearing and the cutting tool as a whole give longer service life, and the stability of the cutter is improved.

By virtue of the bushing introduced in the rotary cutting tool according to the invention between the internal surface of the tool body and the journal bearing next the cutter which sustains maximum loads, said journal bearing operates under less strenuous conditions than this is the case in the tools of the known constructions. The stability of the cutter is improved, extending the periods between its sharpenings. The bushings of the disclosed constructions lend themselves to streamlined production and meet the requirements of rotary machining. The recommended correlation between the dimensions of the principal components provides for an optimum durability of the tool and stability of its cutter already at the stage of designing and developing the tool.

What is claimed is:

1. A rotary cutting tool comprising:
   a body having an internal surface;
   a shaft fitted into said body;
   a cutter attached to a cantilevered end of said shaft;
   journal bearings fitted into said body to support said shaft;
   thrust bearings fitted into said body to support said shaft;
   a bushing providing a means of fitting one of said journal bearings which is next said cutter, said bushing having end faces;
   a central portion of said bushing which is of uniform stiffness both longitudinally and circumferentially and has a surface mating said internal surface of said body and being of identical shape therewith;
   end portions of said bushing which are of nonuniform stiffness changing from a maximum to a minimum longitudinally towards said end faces as well as circumferentially within said end portions, the maximum and minimum values of the stiffness of said end portions being located in the same plane.

2. A rotary cutting tool as claimed in claim 1 wherein said end portions of said bushing are shaped as bodies of revolution the generatrices whereof differ from the generatrix of said central portion of said bushing.

3. A rotary cutting tool as claimed in claim 2 wherein the external surfaces of said end portions of said bushing are of a tapered shape.

4. A rotary cutting tool as claimed in claim 2 wherein the external surfaces of said end portions of said bushing are of a spherical shape.

5. A rotary cutting tool as claimed in claim 2 wherein the external surfaces of said end portions of said bushing are of a stepped cylindrical shape.

6. A rotary cutting tool as claimed in claim 2 wherein said end portions of said bushing are provided with longitudinal slots spaced nonequidistantly apart all the way along the circumference.

7. A rotary cutting tool as claimed in claim 2 wherein said end portions of said bushing are eccentric with respect to the axis of said central portion of said bushing, the eccentricities of said end portions being located on either side of the axis of said central portion.

8. A rotary cutting tool as claimed in claim 2 wherein said end portions of said bushing are provided with collars, two surfaces whereof facing one another making the same angles with the axis of said bushing and two other surfaces whereof being parallel to one another.

9. A rotary cutting tool as claimed in claim 1 wherein said journal bearing next said cutter is of a length, as measured along the axis of said cutting tool, determined by the relation $$l/D = 0.15 - 0.5$$

where $l$ is the length of said journal bearing next said cutter, mm; $D$ is the diameter of said cutter, mm.

10. A rotary cutting tool as claimed in claim 9 wherein the ratio of the internal diameter of said journal bearing next said cutter to said diameter of said cutter is determined by the relation $$d/D = 0.2 - 0.6$$

where $d$ is the internal diameter of said journal bearing next said cutter, mm; $D$ is said diameter of said cutter, mm.

11. A rotary cutting tool as claimed in claim 1 wherein the spacing of said journal bearings is less than $2D$ but greater than the distance determined by the expression $$L \geq 10 \sqrt{(0.1d)^4}$$

where $L$ is the spacing of said journal bearings from one another, mm; $d$ is said internal diameter of said journal bearing next said cutter, mm, $D$ is the diameter of said cutter, mm.

* * * * *